US008967719B2

(12) United States Patent
Ngiau et al.

(10) Patent No.: US 8,967,719 B2
(45) Date of Patent: Mar. 3, 2015

(54) EASY ENTRY SEAT SYSTEM WITH SINGLE POSITION MEMORY AND HOLD OPEN FEATURE

(75) Inventors: Christopher Ngiau, Novi, MI (US); Jeffrey P Carroll, West Bloomfield, MI (US); Jonathan A Calhoun, Linden, MI (US)

(73) Assignee: Magna Seating Inc., Aurora, Ontario (CA)

( * ) Notice: Subject to any disclaimer, the term of this patent is extended or adjusted under 35 U.S.C. 154(b) by 190 days.

(21) Appl. No.: 13/697,382

(22) PCT Filed: May 17, 2011

(86) PCT No.: PCT/CA2011/000584
§ 371 (c)(1),
(2), (4) Date: Nov. 12, 2012

(87) PCT Pub. No.: WO2011/143758
PCT Pub. Date: Nov. 24, 2011

(65) Prior Publication Data
US 2013/0057043 A1    Mar. 7, 2013

Related U.S. Application Data

(60) Provisional application No. 61/395,716, filed on May 17, 2010.

(51) Int. Cl.
*B60N 2/06* (2006.01)
*B60N 2/20* (2006.01)
*B60N 2/12* (2006.01)

(52) U.S. Cl.
CPC ..................... *B60N 2/123* (2013.01)
USPC ..................... 297/341; 297/378.12

(58) Field of Classification Search
USPC .......................... 297/341, 342, 378.12, 378.1
See application file for complete search history.

(56) References Cited

U.S. PATENT DOCUMENTS

| 5,597,206 | A | * | 1/1997 | Ainsworth et al. ...... 297/378.12 |
| 5,899,532 | A | | 5/1999 | Paisley et al. |
| 5,944,383 | A | | 8/1999 | Mathey et al. |
| 6,619,741 | B1 | | 9/2003 | Tame |
| 6,827,404 | B2 | | 12/2004 | Blair et al. |
| 6,926,364 | B2 | | 8/2005 | Cooley et al. |
| 7,090,188 | B2 | * | 8/2006 | Severini et al. ............... 248/424 |
| 2004/0026975 | A1 | | 2/2004 | Rausch et al. |
| 2004/0140704 | A1 | | 7/2004 | Abdella et al. |
| 2004/0164600 | A1 | | 8/2004 | Rausch et al. |
| 2004/0262969 | A1 | | 12/2004 | Sasaki et al. |
| 2008/0143160 | A1 | | 6/2008 | Schmale |
| 2009/0134681 | A1 | | 5/2009 | Quast et al. |

* cited by examiner

*Primary Examiner* — Milton Nelson, Jr.
(74) *Attorney, Agent, or Firm* — Miller Canfield

(57) ABSTRACT

A seat assembly for an automotive vehicle includes a seat cushion and a seat back for pivotal movement between an upright seating position and a forwardly dumped position. A recliner mechanism is provided for selectively actuating between a locked and unlocked condition allowing the pivotal movement of the seat back. A seat track assembly provides selective actuation between a locked and unlocked condition allowing fore and aft sliding movement of the seat assembly between a design position and a full forward position. An easy entry memory mechanism is operatively coupled to the recliner mechanism and the seat track assembly for selectively actuating the seat track assembly to the unlocked condition and provide movement of the seat assembly to the full forward position in response to pivotal movement of the seat back to the forwardly dumped position while maintaining memory of the design position.

8 Claims, 6 Drawing Sheets

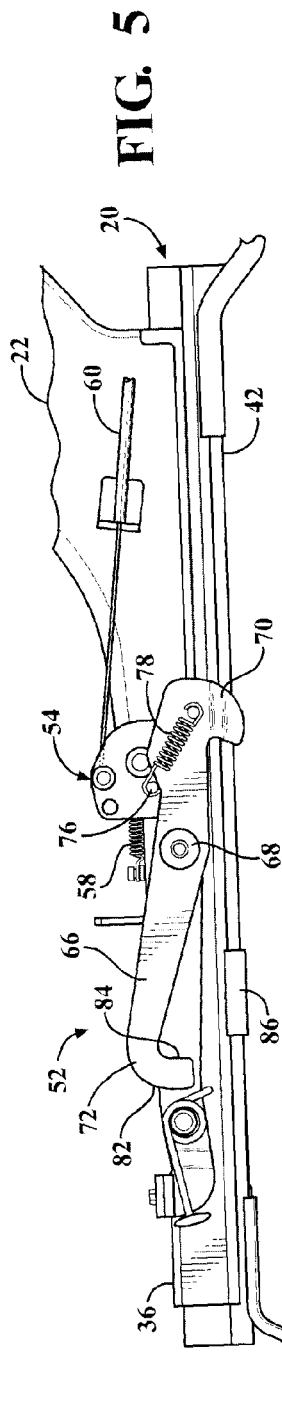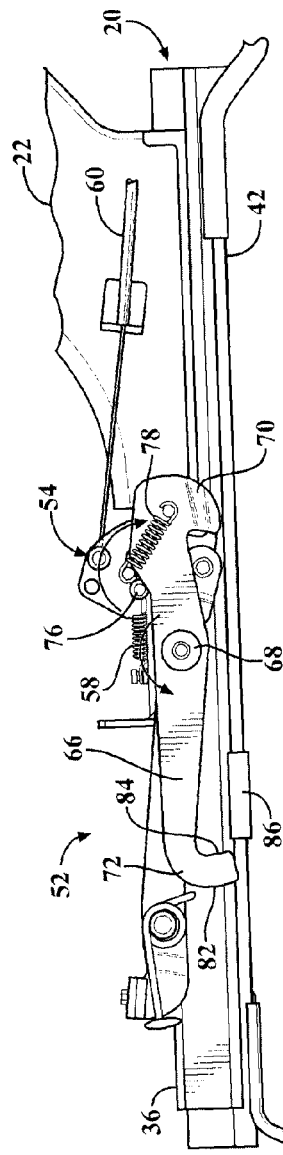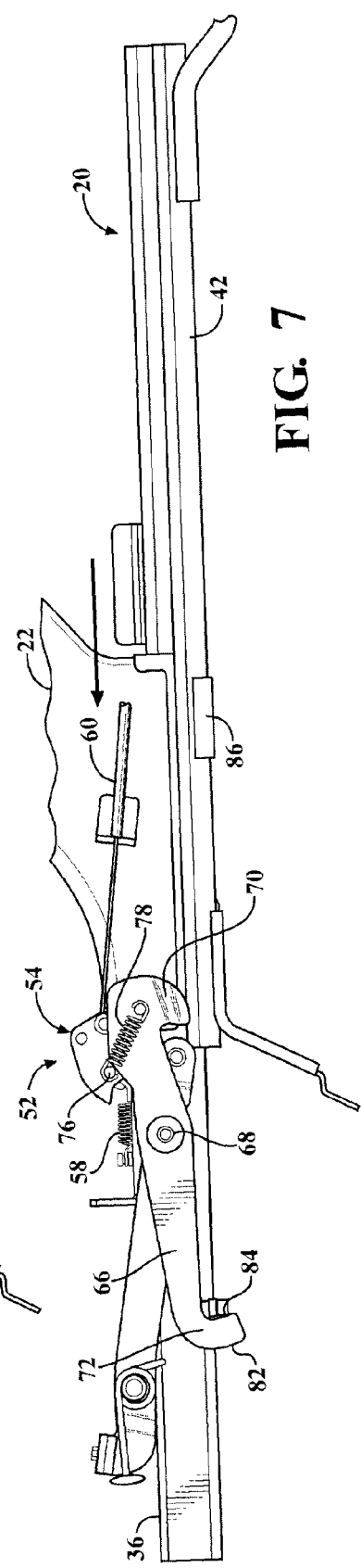

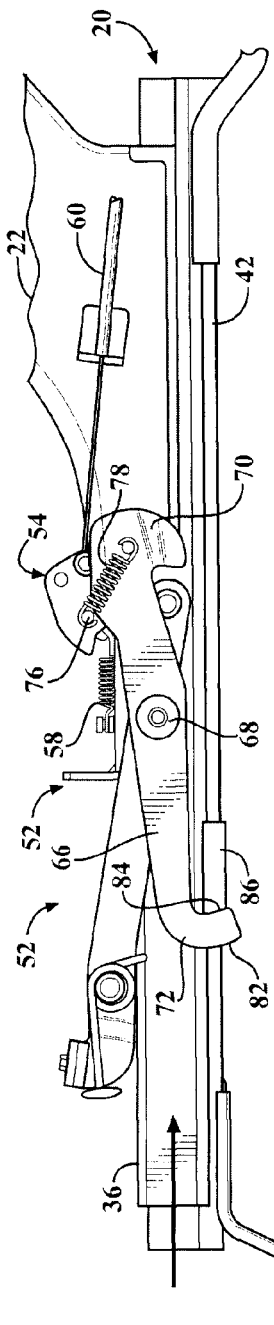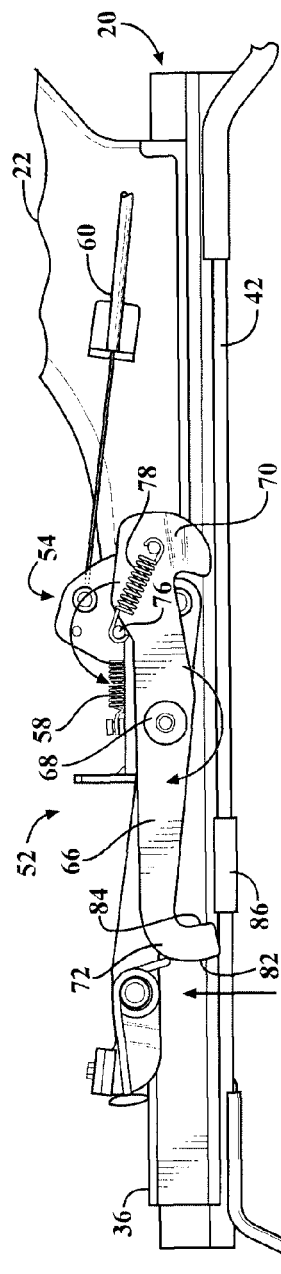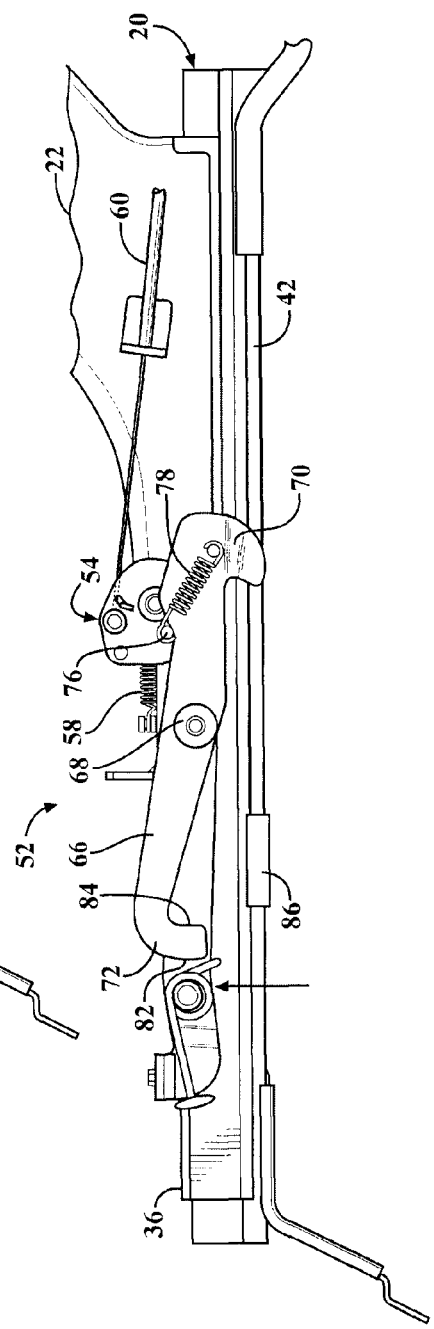

EASY ENTRY SEAT SYSTEM WITH SINGLE POSITION MEMORY AND HOLD OPEN FEATURE

CROSS-REFERENCE TO RELATED APPLICATIONS

This application is a national phase application and claims priority to and all the benefits of, under 35 USC 371, of PCT/CA2011/00584, filed on May 17, 2011, which in turn claims the priority of U.S. Provisional Application No. 61/395,716, filed on May 17, 2010. All applications are incorporated herein by reference in their entireties.

BACKGROUND OF THE INVENTION

1. Field of the Invention

The present invention relates to a vehicle seat assembly adapted to be mounted to a vehicle floor by a track assembly and including a seat back pivotally coupled to a seat cushion by a recliner mechanism wherein an easy entry memory mechanism allows the seat assembly to slide fore and aft along the track assembly between a design position and a full forward position in response to pivotal movement of the seat back while maintaining the memory of the design position.

2. Description of Related Art

Automotive vehicles typically include one or more seat assemblies having a seat cushion and a seat back for supporting passengers above a vehicle floor. The seat assembly is commonly mounted to the vehicle floor by a seat track assembly for providing fore and aft adjustment of the seat assembly for passenger comfort. The seat back is also typically pivotally coupled to the seat cushion by a recliner mechanism for providing pivotal movement between an upright seating position, a plurality of reclined positions, and a forwardly dumped position at least partially overlying the seat cushion.

The seat track assembly provides sliding fore and aft movement of the seat assembly between a design position, a plurality of passenger comfort positions, and a full forward position It is commonly known to provide a release mechanism for selectively unlocking the recliner mechanism to provide pivotal movement of the seat back to the forwardly dumped position. It is also known to provide an easy entry release mechanism for unlocking the seat track assembly in response to pivotal movement of the seat back to the forwardly dumped position. It is known to actuate both release mechanisms to enable pivotal movement of the seat back to the forwardly dumped position and forward sliding of the seat assembly to the full forward position to allow easy ingress and egress within the vehicle behind the seat assembly.

It is desirable to provide an easy entry memory mechanism which allows the seat assembly to slide fore and aft along the track assembly between the design position and the full forward position in response to pivotal movement of the seat back to the forwardly dumped position while maintaining the memory of the design position.

SUMMARY OF THE INVENTION

According to one aspect of the invention, a seat assembly for an automotive vehicle includes a seat cushion and a seat back operatively coupled to the seat cushion for pivotal movement between an upright seating position and a forwardly dumped position at least partially overlying the seat cushion. A recliner mechanism is operatively coupled between the seat cushion and the seat back for selective actuation between a locked and unlocked condition allowing the pivotal movement of the seat back. A seat track assembly is coupled to the seat cushion for selective actuation between a locked and unlocked condition allowing fore and aft sliding movement of the seat assembly within the vehicle between a design position and a full forward position. An easy entry memory mechanism is operatively coupled to the recliner mechanism and the seat track assembly for selectively actuating the seat track assembly to the unlocked condition and provide movement of the seat assembly to the full forward position in response to pivotal movement of the seat back to the forwardly dumped position while maintaining memory of the design position.

BRIEF DESCRIPTION OF THE DRAWINGS

Advantages of the present invention will be readily appreciated as the same becomes better understood by reference to the following detailed description when considered in connection with the accompanying drawings wherein:

FIG. 5 is a side view of the easy entry memory mechanism with the seat assembly in the design position;

FIG. 6 is a side view of the easy entry memory mechanism with the seat assembly in an unlocked condition;

FIG. 7 is a side view of the easy entry memory mechanism in the memory position and the seat assembly in the full forward position;

FIG. 8 is a side view of the easy entry memory mechanism with the seat assembly returning to the design position;

FIG. 9 is a side view of the easy entry memory mechanism with the seat assembly returning to the locked condition; and FIG. 10 is a side view of the easy entry memory mechanism with the seat assembly returned to the design position.

DETAILED DESCRIPTION OF THE PREFERRED EMBODIMENTS

Figure 1:
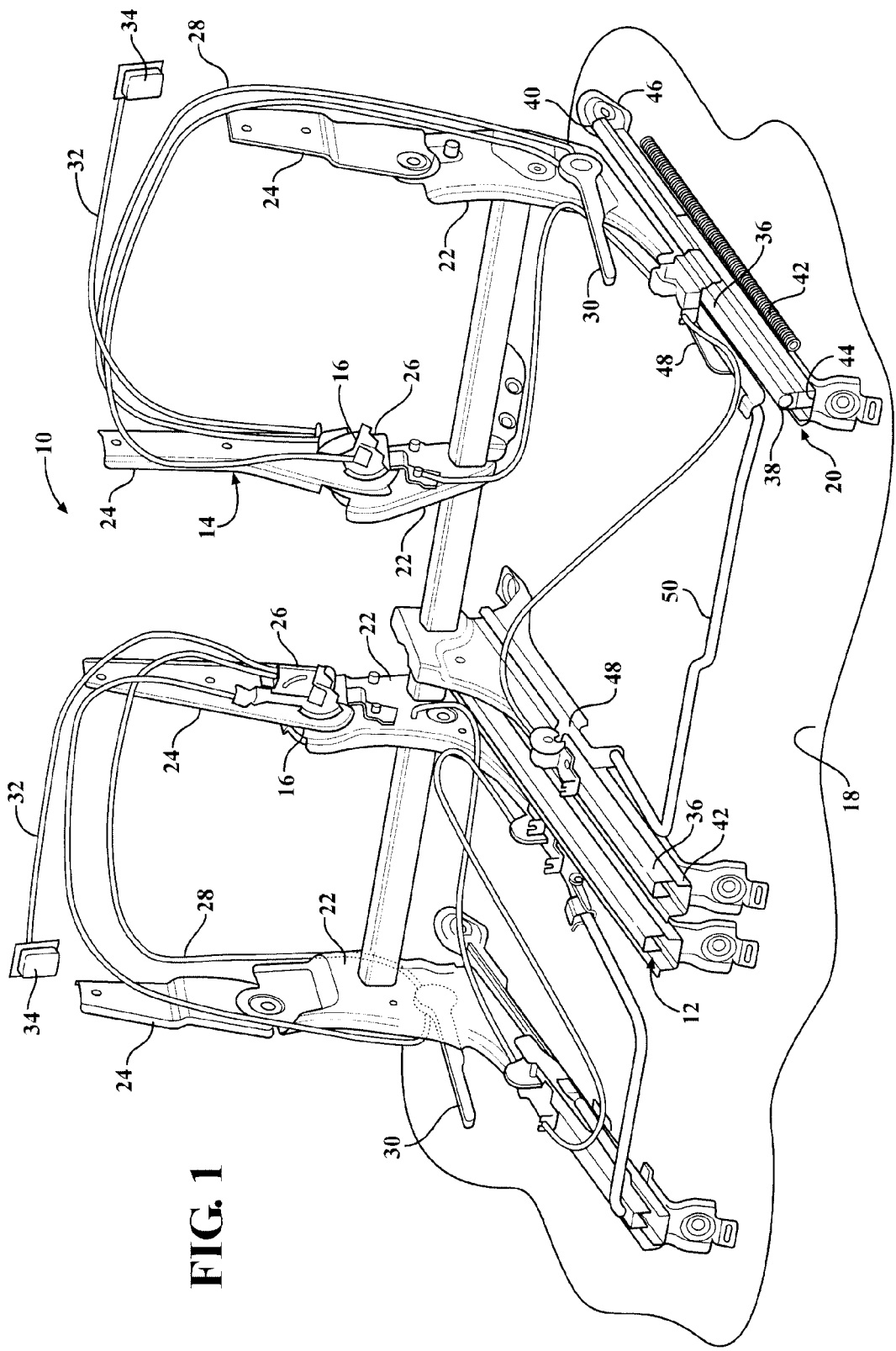
FIG. 1 is a perspective view of a vehicle seat assembly including a seat back pivotally coupled to a seat cushion according to one embodiment of the invention.

Referring to the Figures, wherein like numerals indicate like or corresponding parts throughout the several views, a seat assembly for use in an automotive vehicle is generally shown at 10. Referring to FIG. 1, the seat assembly 10 includes a generally horizontal seat cushion 12 and a generally upright seat back 14 operatively coupled by a recliner mechanism 16 to the seat cushion 12 for providing pivotal movement between an upright seating position, a plurality of reclined positions, and a forwardly dumped position at least partially overlying the seat cushion 12, as is commonly known to one skilled in the art. The seat assembly 10 is adapted to be mounted to a vehicle floor 18 by a seat track assembly 20 for providing fore and aft adjustment of the seat assembly 10.

The seat assembly 10 shown in FIG. 1 is commonly known as a 60-40 split bench type seat assembly; however, a full bench type seat assembly or single bucket type seat assembly may be used without varying the scope of the invention. The seat cushion 12 typically includes a seat cushion frame for supporting a cellular foam pad encased in a trim cover and the seat back 14 typically includes a seat back frame for supporting a cellular foam pad encased in a trim cover, as is commonly known to one skilled in the art. The seat cushion 12 includes a plurality of seat cushion brackets 22 fixedly secured to the seat track assembly 20 and the seat back 14 includes a plurality of seat back brackets 24 pivotally coupled to respective seat cushion brackets 22 by a recliner mechanism 16. The recliner mechanism 16 is a disc recliner as is commonly known in the art, however, may be any type of recliner mechanism for providing selective pivotal movement of the seat back 14 relative to the seat cushion 12. The recliner mechanism 16 of the disc recliner type is fully disclosed in U.S. Pat. No. 6,312,053, which is incorporated by reference herein in its entirety. A recliner release mechanism 26 is operatively coupled to the recliner mechanism 16 for selectively unlocking the recliner mechanism 16 and allowing pivotal movement of the seat back 14 between the seating position, reclined positions, and forwardly dumped position. The recliner release mechanism 26 may be any type known in the art for selectively actuating the recliner mechanism 16 between a locked condition and an unlocked condition allowing pivotal movement of the seat back 14.

Referring to FIG. 1, a first release cable 28 extends between a first release handle 30 and the recliner release mechanism 26 for actuating the recliner mechanism 16 between locked and unlocked conditions to allow pivotal adjustment of the seat back 14 between the plurality of reclined positions. A second release cable 32 extends between a second release handle 34 and the recliner release mechanism 26 for actuating the recliner mechanism 16 between locked and unlocked conditions to allow pivotal movement of the seat back 14 to the forwardly dumped position.

The track assembly 20 provides selective fore and aft sliding adjustment of the seat assembly 10 along the vehicle floor 18. The seat track assembly 20 includes an upper track 36 extending between opposite forward and rearward ends 38, 40 and slidably coupled to a lower track 42 extending between corresponding forward and rearward ends 44, 46. The seat cushion brackets 22 are fixedly secured to the upper track 36 adjacent the rearward ends 40. The lower track 42 is fixedly secured to the vehicle floor 18. A seat track locking mechanism 48 of any type commonly known in the art is operatively coupled between the upper track 36 and lower track 42 for selective actuation between a locked condition and an unlocked condition allowing fore and aft sliding movement of the upper track 36 relative to the lower track 42. As shown in FIG. 1, a pair of upper and lower tracks 36, 42 are spaced apart and parallel for supporting the seat cushion 12 on the vehicle floor 18. Each pair of upper and lower tracks 36, 42 includes a locking mechanism 48 for actuation between the locked and unlocked conditions. A towel bar 50 extends between and is operatively coupled to each locking mechanism 48 for selectively and simultaneously actuating the locking mechanisms 48 between the locked and unlocked conditions, as is commonly known in the art.

Figure 2:
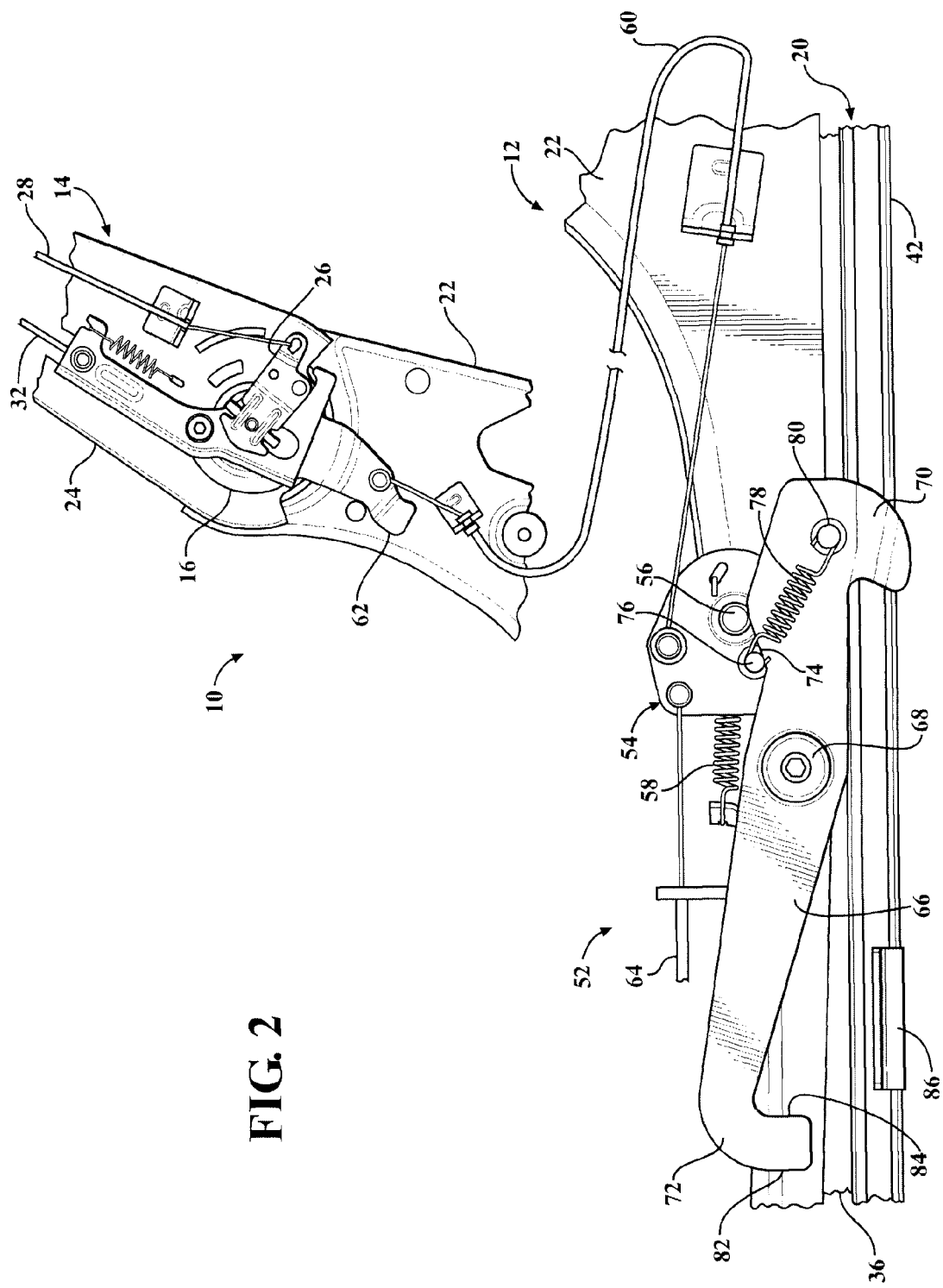
FIG. 2 is a fragmentary partially exploded side view of the seat assembly in a design position and an easy entry memory mechanism according to one embodiment of the invention.

Referring to FIG. 2, the seat assembly 10 further includes an easy entry memory mechanism 52 operatively coupled to the track assembly 20 for allowing sliding movement of the seat assembly 10 between a design position and a full forward position in response to pivotal movement of the seat back 14 while maintaining the memory of the design position. More specifically, the memory mechanism 52 includes a control cam 54 pivotally mounted to the upper track 36 by pivot pin 56. A first biasing spring 58 is coupled between the upper track 36 and the control cam 54 for biasing the control cam 54 in the counterclockwise direction when viewed in FIG. 2. A Bowden type control cable 60 is coupled between the control cam 54 and a lower arm 62 of the seat back bracket 24 for rotating the control cam 54 in the clockwise direction in response to pivotal movement of the seat back 14 between the seating position and the forwardly dumped position. A Bowden type release cable 64 is coupled between the control cam 54 and the locking mechanism 48 for automatically actuating the locking mechanism 48 between the locked and unlocked condition in response to rotation of the control cam 54.

The easy entry memory mechanism 52 also includes a memory arm 66 pivotally connected to the upper track 36 by a pivot pin 68 and extending longitudinally between a control end 70 and an opposite hook end 72. The pivot pin 68 is positioned generally midway between the control end 70 and the hook end 72. The memory arm 66 includes an upper inclined cam surface 74 extending between the pivot pin 68 and the control end 70 for engagement with a cam pin 76 projecting outwardly from the control cam 54. The cam pin 76 is guided along the cam surface 74 for actuating the memory arm 66 between a raised position and a lowered position. A second biasing spring 78 extends between the cam pin 76 and a spring post 80 projecting from the control end 70 for maintaining engagement between the cam pin 76 and cam surface 74 and biasing the memory arm 66 to the raised position. The hook end 72 includes a front guide surface 82 facing the forward end 44 of the lower track 42 and an opposite hook surface 84 facing the rearward end 46 of the lower track 42. The hook surface 84 engages a stop tab 86 projecting from the lower track 42 when in the lowered position for defining the design position.

Figure 3:
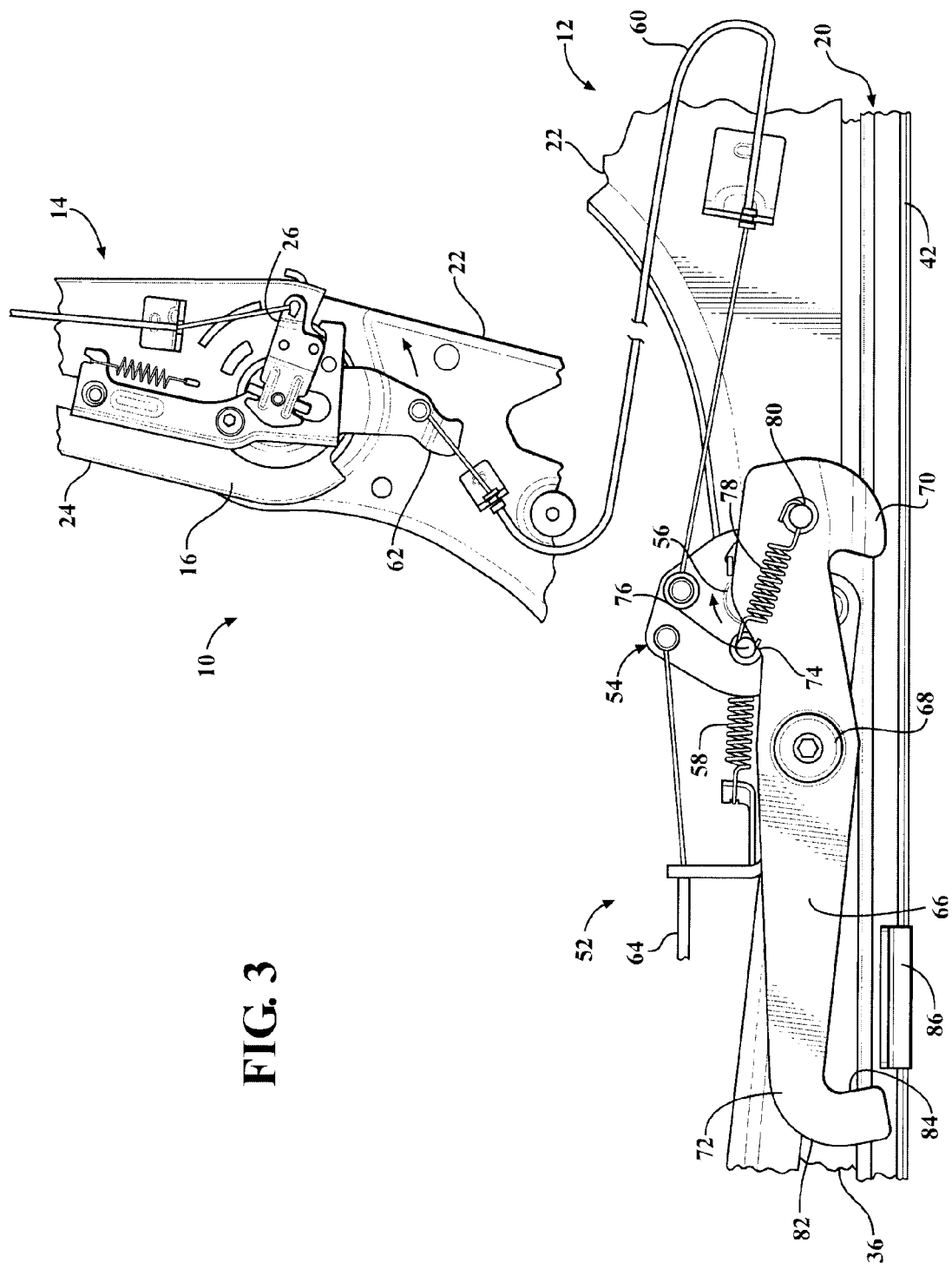
FIG. 3 is a fragmentary partially exploded side view side view of the seat assembly actuating the easy entry memory mechanism in response to pivotal movement of the seat back.
Figure 4:
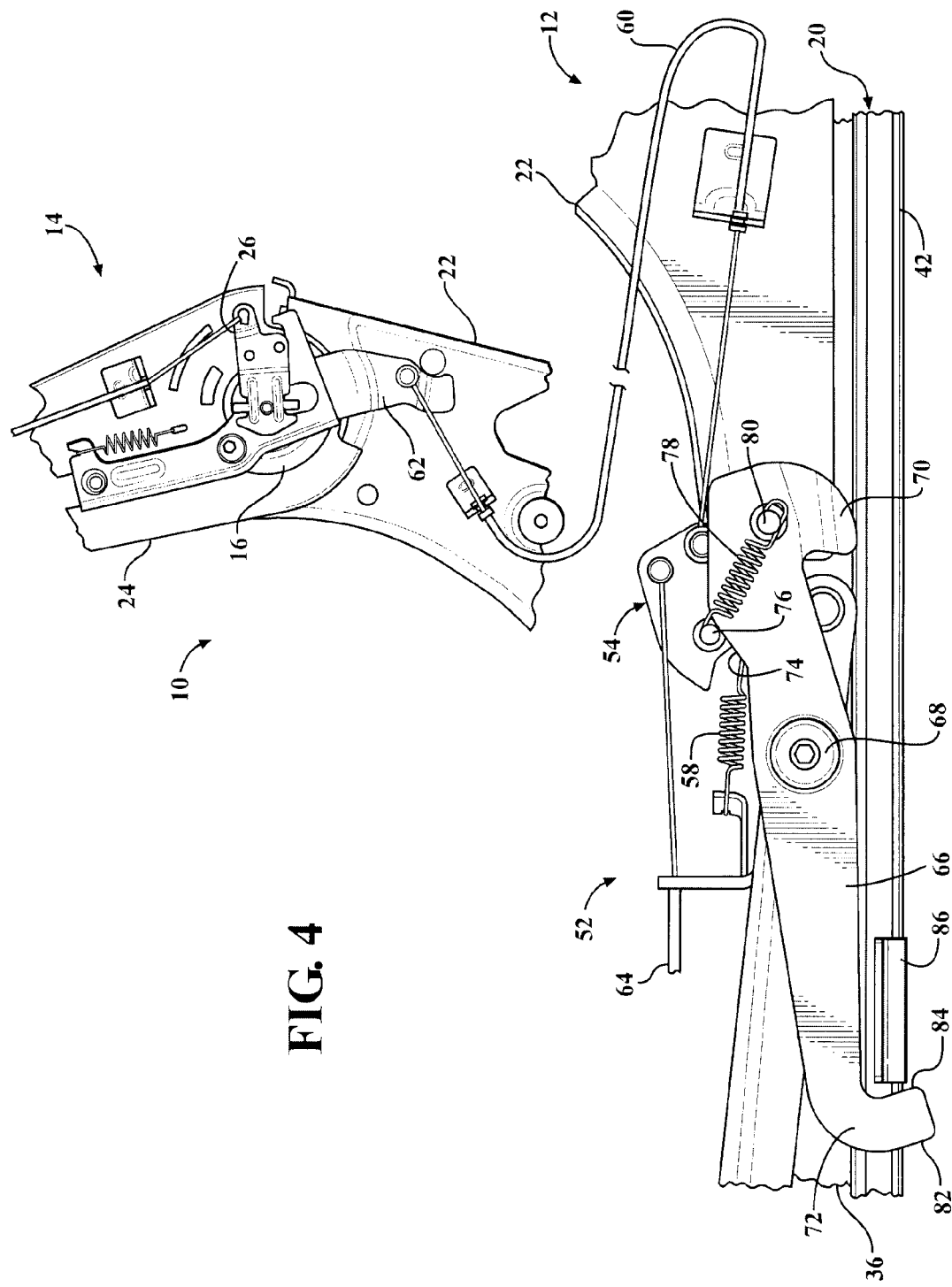
FIG. 4 is a fragmentary partially exploded side view of the seat assembly with the seat back in a forwardly dumped position fully actuating the easy entry memory mechanism to the memory position.

In operation, referring to FIGS. 2-10, the seat assembly 10 is shown in the design position with the seat back 14 in the upright seating position, or a reclined position. The recliner mechanism 16 is in a locked condition preventing pivotal movement of the seat back 14 and the track locking mechanism 48 is in a locked condition preventing fore and aft sliding movement of the seat assembly 10 along the track assembly 20. The first release handle 30 may be actuated to unlock the recliner mechanism 16 and allow reclining pivotal movement of the seat back 14 without actuating the track locking mechanism 48, as is commonly known in the art. Upon actuation of the second release handle 34, the recliner mechanism 16 is actuated to the unlocked condition for pivotal movement from the seating position to the forwardly dumped position as shown in FIGS. 3 and 4. Forward pivotal movement of the seat back 14 toward the forwardly dumped position pulls on the control cable 60 to rotate the control cam 54 in the clockwise direction as shown in FIGS. 3 and 6. Rotation of the control cam 54 allows the cam pin 76 to guide along the cam surface 74 of the memory arm 66. The second biasing spring 78 urges the memory arm 66 to rotate from the raised position, shown in FIGS. 2 and 5, to the lowered position, shown in FIG. 4, forward of the stop tab 86. Rotation of the control cam 54 also simultaneously pulls on the release cable 64 to actuate the track locking mechanism 48 from the locked condition to the unlocked condition allowing sliding fore and aft movement of the seat assembly 10 along the track assembly 20. With the seat back 14 in the forwardly dumped position, tension in the control cable 60 maintains the rotation of the control cam 54, and thus tension in the release cable 64, to hold open the track locking mechanism 48 in the unlocked condition allowing sliding movement of the seat assembly 10 to the full forward position shown in FIG. 7.

Referring to FIGS. 8-10, as the seat assembly 10 is returned aft from the full forward position, the hook surface 84 of the hook end 72 on the memory arm 66 engages the stop tab 86 on the lower track 42 to stop the seat assembly 10 in the design position. In the design position, the seat back 14 may be pivotally returned from the forwardly dumped position to the upright seating position to release the tension on the control cable 60. The control cam 54 is biased by the first biasing spring 58 to rotate counterclockwise, as shown in FIG. 9. The counterclockwise rotation of the control cam 54 also releases tension on the release cable 64 to return the track locking mechanism 48 to the locked condition and prevent further fore and aft sliding movement of the track assembly 20. Further, the cam pin 76 is guided along the cam surface 74 of the memory arm 66 while the second biasing spring 78 urges the memory arm 66 to rotate from the lowered position to the raised position clear of the stop tab 86 as shown in FIGS. 9 and 10.

Finally, if the seat assembly 10 is positioned aft of the design position wherein the memory arm 66 is aft of the stop tab 86, when the memory arm 66 is in the lowered position the front guide surface 82 of the hook end 72 engages the stop tab 86 to raise the memory arm 66 above and then over the stop tab 86 to return to the lowered position forward of the stop tab 86. Therefore, with the seat back 14 pivoted in the forwardly dumped position, the easy entry memory mechanism 52 always maintains the memory of the design position upon return of the seat assembly 10.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A seat assembly for an automotive vehicle comprising:
    a seat cushion;
    a seat back operatively coupled to said seat cushion for pivotal movement between an upright seating position and a forwardly dumped position at least partially overlying said seat cushion;
    a recliner mechanism operatively coupled between said seat cushion and said seat back for selectively actuating between a locked and unlocked condition allowing said pivotal movement of said seat back;
    a seat track assembly coupled to said seat cushion for selective actuation between a locked and unlocked condition allowing fore and aft sliding movement of said seat assembly within the vehicle between a design position and a full forward position; and
    an easy entry memory mechanism operatively coupled to said recliner mechanism and said seat track assembly for selectively actuating said seat track assembly to said unlocked condition and provide movement of said seat assembly to the full forward position in response to pivotal movement of said seat back to said forwardly dumped position while maintaining memory of said design position, said easy entry memory mechanism includes a control cam rotatably coupled to said seat track assembly and operatively coupled to said seat back for actuation in response to pivotal movement of said seat back between said upright seating position and said forwardly dumped position and a memory arm rotatably coupled to said seat track assembly and operatively coupled to said control cam for actuation between a raised position and a lowered position for maintaining said design position in response to rotation of said control cam; wherein
    said control cam is operatively coupled to said seat track assembly for actuation of said seat track assembly between said locked and unlocked conditions in response to rotation of said control cam, and
    said memory arm includes a control end biased into engagement with said control cam and an opposite hook end for engaging with a stop tab on said seat track assembly when said memory arm is in said lowered position thereby defining said design position.

2. A seat assembly as set forth in claim 1 wherein said control cam includes a cam pin engaged with a cam surface on said memory arm for actuating said memory arm between said raised and lowered positions in response to rotation of said control cam.

3. A seat assembly as set forth in claim 2 further including a first biasing spring coupled between said control cam and said seat track assembly for biasing said control cam in a first direction.

4. A seat assembly as set forth in claim 3 further including a second biasing spring coupled between said control cam and said memory arm for maintaining engagement between said cam pin and said cam surface and biasing said memory arm to said raised position.

5. A seat assembly as set forth in claim 4 wherein said seat track assembly includes an upper track slidably coupled to a lower track, wherein said control cam and said memory arm are pivotally coupled to said upper track and said stop tab is fixed secured to said lower track defining said design position.

6. A seat assembly as set forth in claim 5 further including a control cable coupled between said control cam and said seat back for rotating said control cam in response to pivotal movement of said seat back between said seating position and said forwardly dumped position.

7. A seat assembly as set forth in claim 6 further including a release cable coupled between said control cam and said seat track assembly for actuating said seat track assembly between said locked and unlocked conditions in response to rotation of said control cam.

8. A seat assembly as set forth in claim 7 wherein said hook end of said memory arm includes a guide surface and an opposite facing hook surface for engaging said stop tab in said design position.

* * * * *